(12) United States Patent
Schuettenberg

(10) Patent No.: US 8,220,819 B2
(45) Date of Patent: Jul. 17, 2012

(54) FRONT TOW EXTENDED SADDLE

(75) Inventor: Donald W. Schuettenberg, Antioch, IL (US)

(73) Assignee: ATC Leasing Company LLC, Kenosha, WI (US)

( * ) Notice: Subject to any disclaimer, the term of this patent is extended or adjusted under 35 U.S.C. 154(b) by 0 days.

(21) Appl. No.: 13/171,665

(22) Filed: Jun. 29, 2011

(65) Prior Publication Data

US 2011/0254247 A1    Oct. 20, 2011

Related U.S. Application Data

(63) Continuation of application No. 11/463,390, filed on Aug. 9, 2006, now Pat. No. 7,980,582.

(51) Int. Cl.
*B62D 53/08* (2006.01)

(52) U.S. Cl. .................................... 280/476.1

(58) Field of Classification Search ............... 280/476.1, 280/475, 767, 423.1, 656, 425.2
See application file for complete search history.

(56) References Cited

U.S. PATENT DOCUMENTS

| | | |
|---|---|---|
| 3,737,177 A | 6/1973 | Gal |
| 4,202,562 A | 5/1980 | Sorenson |
| 4,398,743 A | 8/1983 | Belsky et al. |
| 4,493,491 A | 1/1985 | Karlik |
| 4,555,214 A | 11/1985 | Morton |
| 4,737,066 A | 4/1988 | Allison, Jr. |
| 4,867,468 A | 9/1989 | Paul et al. |
| 4,949,985 A | 8/1990 | Lichter |
| 4,974,125 A | 11/1990 | McGehee |
| 5,326,123 A | 7/1994 | Guest et al. |
| 5,391,044 A | 2/1995 | Young |
| 5,401,050 A | 3/1995 | Baker |
| 5,465,813 A | 11/1995 | Lichter |
| 5,566,964 A * | 10/1996 | Leonard ............ 280/417.1 |
| 5,703,411 A | 12/1997 | Bella et al. |
| 5,722,677 A | 3/1998 | Lichter et al. |
| 5,853,283 A | 12/1998 | Grant |
| 5,873,593 A | 2/1999 | Gesuale |
| 5,947,503 A | 9/1999 | Tompkins |
| 6,109,642 A | 8/2000 | Schuettenberg |
| 6,120,051 A | 9/2000 | Lichter et al. |
| 6,139,250 A | 10/2000 | Nalasco |
| 6,209,297 B1 | 4/2001 | Yeomans et al. |
| 6,874,803 B2 * | 4/2005 | McDougall et al. ....... 280/441.2 |
| 6,893,039 B2 | 5/2005 | Scharmuller |
| 7,017,934 B2 | 3/2006 | Harris |

(Continued)

FOREIGN PATENT DOCUMENTS

GB         2040847         9/1980

*Primary Examiner* — Tashiana Adams
(74) *Attorney, Agent, or Firm* — Vorys, Sater, Seymour and Pease LLP

(57) ABSTRACT

A front tow extended saddle is disclosed. The saddle allows a first towing truck to mount a second truck, facing forward, behind the first truck, in order to tow the second truck to a distant location. The saddle allows the towed truck to face forward during transport, thus allowing for the normal loads and stresses of movement on the towed truck. This configuration is preferable to movement with the towed truck facing-rearward, in which the typical aerodynamic surfaces of a large truck act as a drag during transport, imposing high wind loads and unusual stresses. The front tow extended saddle is also designed to minimize the required vertical rise on the towed truck, which also avoids additional stresses during loading and unloading onto the towing truck.

4 Claims, 6 Drawing Sheets

U.S. PATENT DOCUMENTS

| | | |
|---|---|---|
| 7,100,933 B2 | 9/2006 | Zackovich et al. |
| 7,153,082 B2 | 12/2006 | Nalasco |
| 7,188,848 B2 | 3/2007 | Chapman |
| 7,422,225 B2 | 9/2008 | Troha et al. |
| 2002/0053781 A1 | 5/2002 | Troha et al. |
| 2004/0036255 A1 | 2/2004 | Orlando |
| 2006/0226612 A1 | 10/2006 | Smith et al. |
| 2008/0157504 A1 | 7/2008 | Schuettenberg |

\* cited by examiner

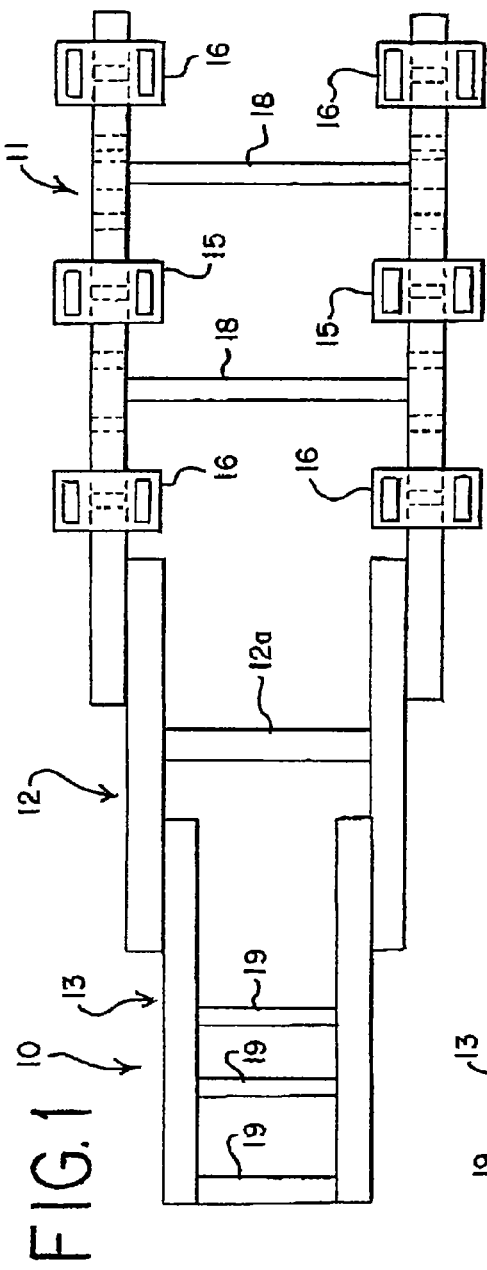
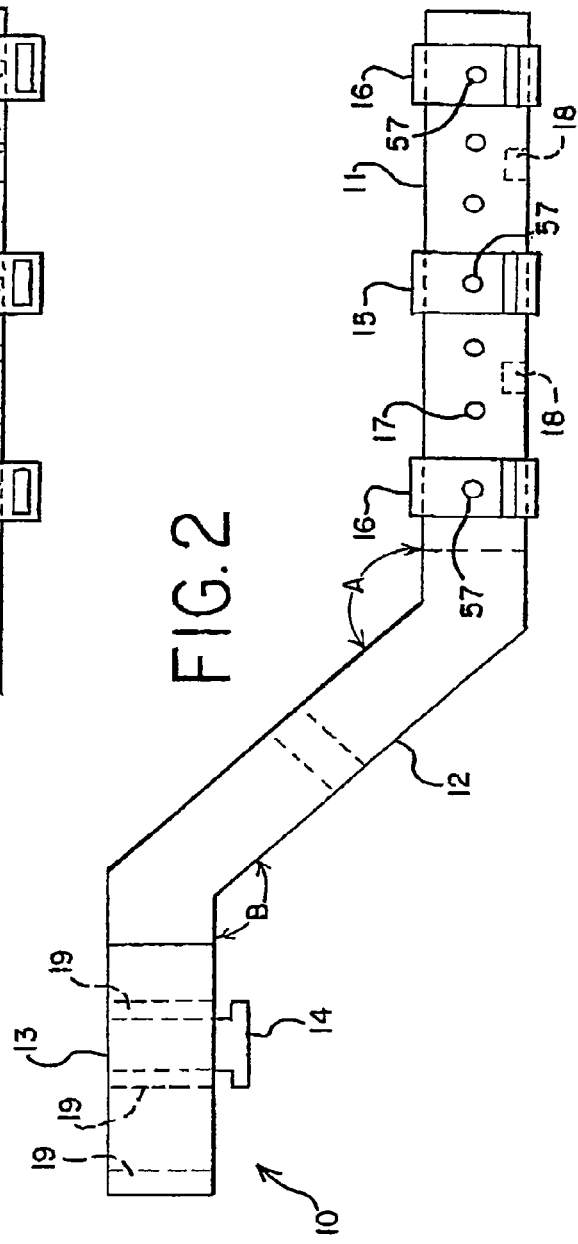

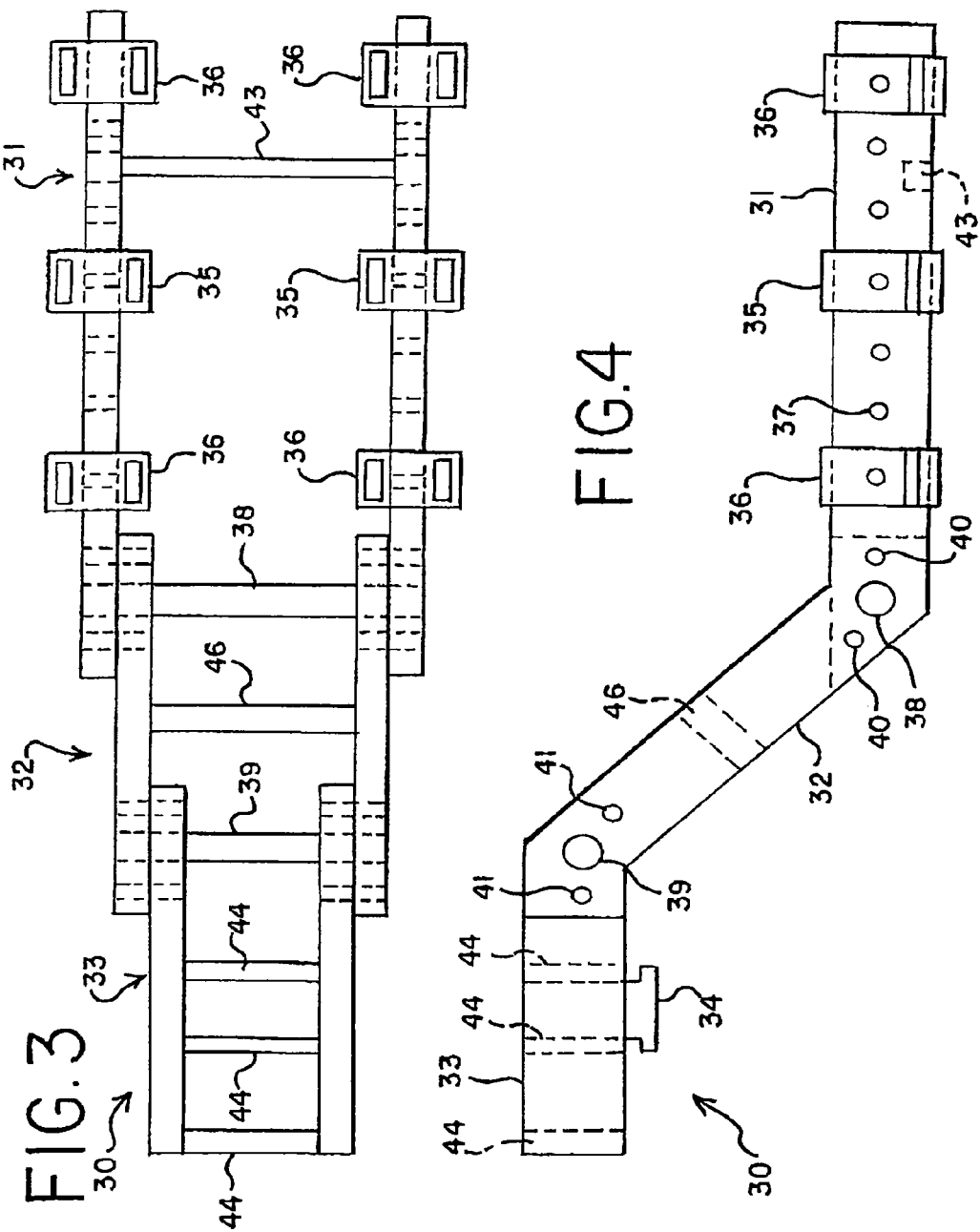

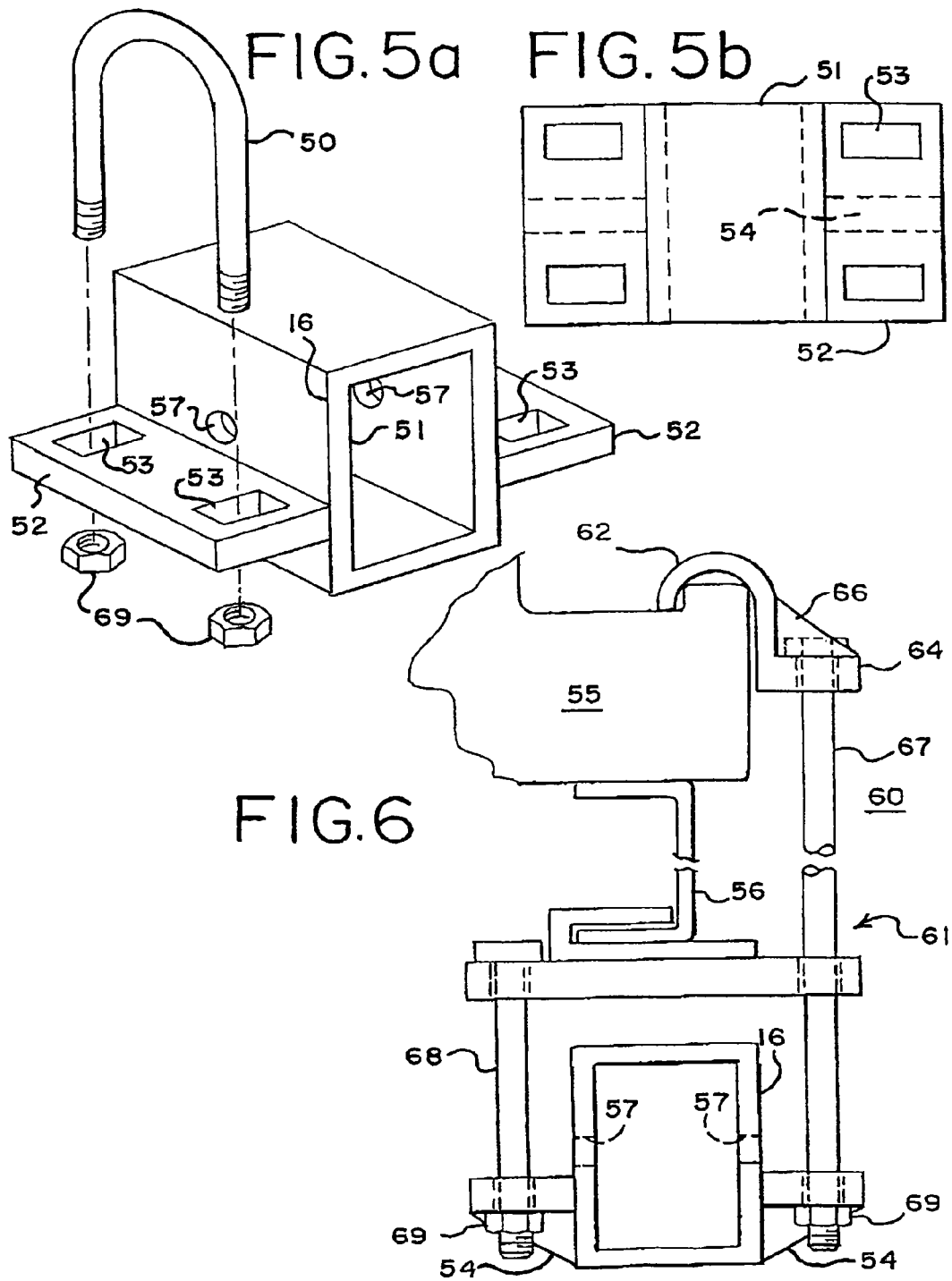

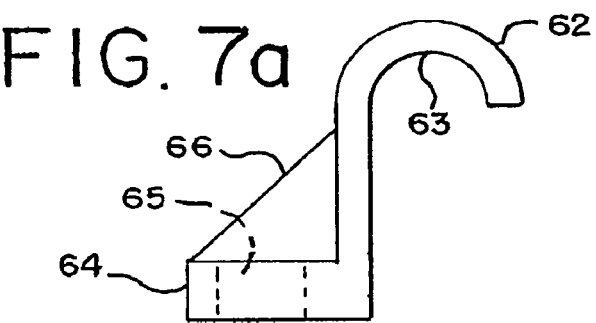
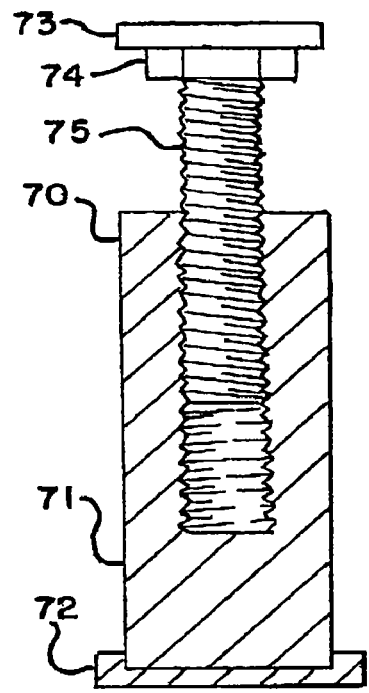
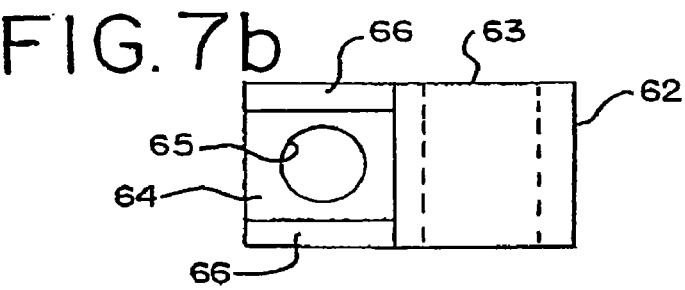
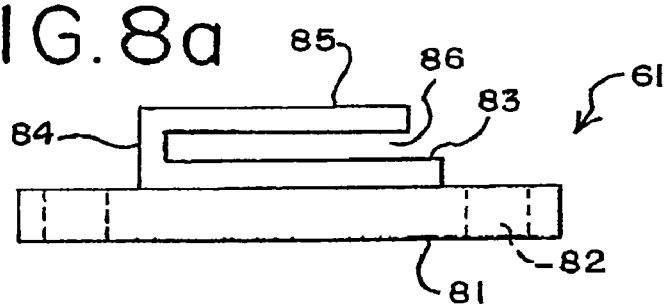
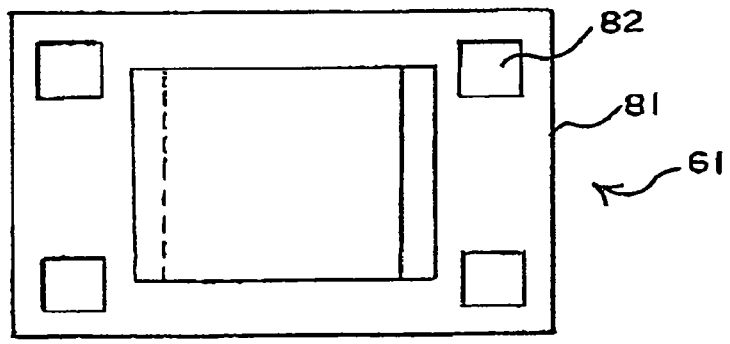

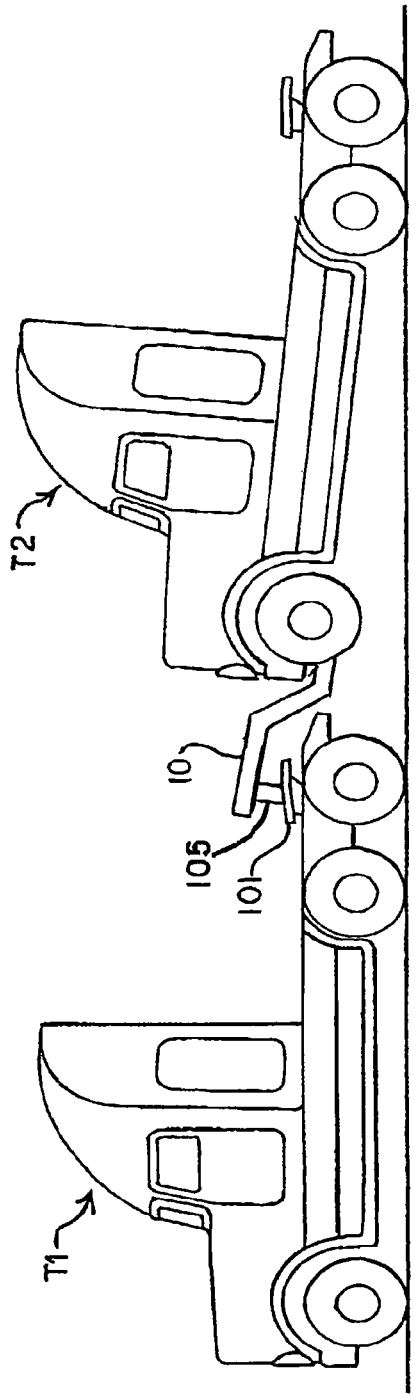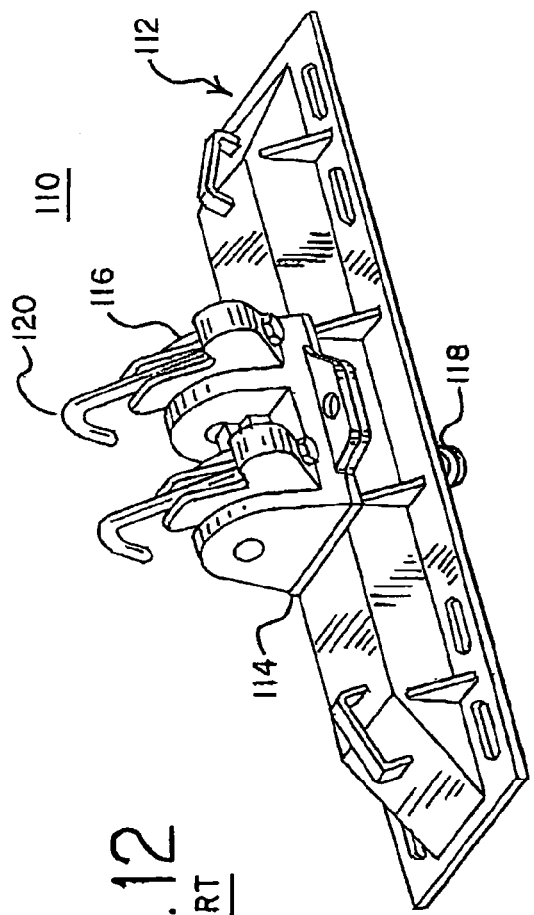
FIG. 11
FIG. 12
PRIOR ART

FRONT TOW EXTENDED SADDLE

RELATED APPLICATIONS

This application is a continuation of U.S. application Ser. No. 11/463,390 filed on Aug. 9, 2006, now U.S. Pat. No. 7,980,582.

FIELD OF THE INVENTION

This invention generally relates to towed motor vehicle transportation and tools for assisting in towing of vehicles from one location to another location.

BACKGROUND OF THE INVENTION

The economy of the United States, if not of the world, depends to a great extent on fleets of large trucks for the distribution of goods, such as foods, consumer products, durable goods, and even industrial equipment. There are many manufacturers of such trucks, which concern primarily, but are not limited to, class 7 or class 8 over-the-road trucks. Once these trucks are manufactured, they require shipment or transportation either to the carrier or other company for whom the truck was made, or to a dealer who sells or leases these trucks. The most obvious method to transport these trucks is by driving them directly to their destination. This method has disadvantages, at least because each truck requires a driver, who must be paid for his or her services and for whom return transportation must be arranged.

In order to overcome the necessity of a driver for delivering each truck, a variety of techniques have been devised to use a first truck that will carry or tow one or more additional trucks to the desired destination. One example is shown in U.S. Pat. No. 4,555,214. This patent discloses a tow bar that attaches to the fifth wheel of both the towing vehicle and the towed vehicle. The towed vehicle is towed in a rear-ward fashion behind the front vehicle. Using this technique, the towed vehicle is exposed to the full force of the air that is encountered during the tow. Any aerodynamic surfaces of the towed vehicle will be subjected to reverse stresses, i.e., the wind will impose loads on the truck at 180° from the direction expected during the design of the truck. Thus, the roof cap, side fairings, and any additional fairings, such as side and chassis fairings, should be braced or buttressed for the trip. This adds additional cost to the delivery of the truck. In addition, it is not clear that, even using both fifth wheels, the towed truck will have sufficient freedom of movement to be able to rotate slightly during turns.

Another technique is disclosed in U.S. Pat. No. 4,867,468. This patent discloses a decking bar that mounts to the truck chassis in front of and above the front axle of the towed vehicle. The decking bar has a relatively uniform cross section with differently-shaped end portions and is also relatively short. Using this technique, the towed truck is lifted vertically and is not drawn close in a horizontal direction. In order to minimize the vertical lift, the decking bar is mounted above the front axle of the towed truck, which is then suspended by mounting the decking bar to the chassis of the towed truck.

Another technique is disclosed in U.S. Pat. No. 5,873,593. This patent discloses a piggyback truck transport system. Using this system, a first towing truck mounts a second towed truck on its rear portion. The towed truck is lifted a substantial distance in a vertical direction, putting a stress on the truck and also putting the combination load at risk for violating a vertical height limit. The towed truck is lifted a substantial distance because its front wheels rest on the rear of the towing truck, thus elevating the towed truck a considerable distance. This height may limit the route which is taken in delivering the trucks. The height may be lessened by removing the front tires of the towed vehicles, which also adds to the delivery expense.

Trucks may also be transported with equipment and a method disclosed in U.S. Pat. No. 6,120,051. This patent discloses a method in which a first truck tows a second, rear-facing truck, using a special beam assembly. In this method, a boom saddle is used in conjunction with the fifth wheel of the towing truck and the fifth wheel or a support mount of the towed vehicle. The special provisions of the boom saddle allow for lateral and vertical movement of the beam assembly. While this method works well, it continues to have the disadvantage of towing a vehicle that faces rearward. Thus, the structure of the towed vehicle must be braced or buttressed during towing, adding to the cost of the tow. In addition, the extra wind resistance of the open rear portion of the truck detracts significantly from fuel economy during a long tow, such as from a manufacturer to a customer or dealer.

The invention provides better equipment and a better method for towing trucks. These and other advantages of the invention, as well as additional inventive features, will be apparent from the description of the invention provided herein.

BRIEF SUMMARY OF THE INVENTION

One embodiment is a front tow extended saddle. The front tow extended saddle includes a front portion for interfacing with a saddle mount or fifth wheel, the front portion having two first rails spaced apart an outer first distance between the two first rails. The extended saddle also includes a middle portion for adapting an elevation of a towed truck, the middle portion having two second rails spaced apart an inner second distance and an outer third distance between the two second rails, and a rear portion for adjustably mounting to an axle and a frame of the towed truck, the rear portion having two third rails spaced apart a fourth inner distance between the two third rails, wherein the front portion is joined at a first angle to the middle portion and the middle portion is joined to the rear portion at a second angle, the front portion is configured for mounting to a towing truck and the rear portion is configured for horizontally adjustable, rigid mounting to the towed truck, the front portion mounting configuration allowing for rotation of the front tow extended saddle with respect to the towing truck.

Another embodiment provides a front tow extended saddle. The front tow extended saddle includes a front portion for interfacing with a saddle mount or fifth wheel, the front portion including a first set of two joined rails spaced apart an outer first distance, a middle portion for adapting an elevation of a towed truck, the middle portion having a second set of two joined rails spaced apart an inner second distance and an outer third distance. The front tow extended saddle also includes a rear portion having a third set of two joined rails spaced apart an inner fourth distance for adjustably mounting to an axle and a frame of the towed truck, wherein the front portion is rotatably joined at a first angle to the middle portion and the middle portion is rotatably joined to the rear portion at a second angle, wherein the front portion is configured for mounting to a towing truck and the rear portion is configured for adjustable, rigid mounting to the towed truck, the front portion mounting allowing for rotation of the front tow extended saddle with respect to the towing truck, and wherein the first angle and the second angle may be the same or may be different.

In yet another aspect, an embodiment is a front tow extended saddle. The front tow extended saddle includes a front portion having a first set of two spaced apart bars on a first plane for interfacing with a saddle mount or fifth wheel of a towing vehicle, and a rear portion having at least a second set of two spaced apart bars not on the first plane for adjustably mounting to an axle and a frame of a vehicle to be towed, wherein the front portion is joined at an angle to the rear portion, and wherein the front portion is configured for mounting to the towing vehicle and the rear portion is configured for horizontally-adjustable, rigid mounting to the vehicle to be towed, and wherein the front portion is configured to allow rotation of the front tow extended saddle with respect to the towing vehicle.

Another embodiment is a method of preparing to tow a forward-facing towed truck with a towing truck. The method includes a step of furnishing a front tow extended saddle, the front tow extended saddle including a front portion of a first set of spaced apart rails for interfacing with a saddle mount or fifth wheel on the towing truck, a middle portion of a second set of spaced apart rails for adapting an elevation of the forward-facing towed truck, and a rear portion of a third set of spaced apart rails for adjustably mounting to an axle and a frame of the towed truck, wherein the front portion is joined at a first angle to the middle portion and the middle portion is joined to the rear portion at a second angle, and wherein the front portion is configured to allow rotation of the front tow extended saddle with respect to the towing truck and wherein the rear portion is configured for adjustable, rigid mounting to the forward-facing towed truck. The method also includes mounting the front portion to the towing truck, adjusting a horizontal position of at least two axle security assemblies, fixedly mounting the rear portion to an axle of the towed truck using the at least two axle security assemblies, adjusting a horizontal position of at least two lower security assemblies, and fixedly mounting the rear portion to a body of the towed truck using the at least two lower security assemblies, wherein front wheels of the towed truck are optionally raised from a ground surface.

Another aspect of the invention is a spacer block assembly. The spacer block assembly includes an elongated spacer block having inner and outer surfaces, a threaded fastener for positioning within the block, at least one spacer pad on at least one end of the spacer block or the fastener, and a nut to lock the fastener in position.

Other aspects and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 1 is a top view of a first embodiment of a front tow extended saddle;

FIG. 2 is a side view of the embodiment of FIG. 1;

FIG. 3 is a top view of a second embodiment of a front tow extended saddle;

FIG. 4 is a side view of the embodiment of FIG. 1;

FIG. 5 is an exploded view of a lower security assembly;

FIG. 6 is a front view of a security assembly including a top frame clamp and a lower frame clamp;

FIGS. 7a and 7b are front and top views respectively of the top frame clamp of FIG. 6;

FIG. 7c is an embodiment of a frame spacer useful with embodiments of the front tow extended saddle;

FIGS. 8a and 8b are front and top view respectively of the lower frame clamp of FIG. 6;

FIG. 11 is a side view of a method of using the embodiment of FIG. 1; and

FIG. 12 is a perspective view of a self-lubricated king pin and saddle assembly useful for mounting embodiments of the present front tow extended saddle While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PRESENTLY PREFERRED EMBODIMENTS OF THE INVENTION

Figure 9:
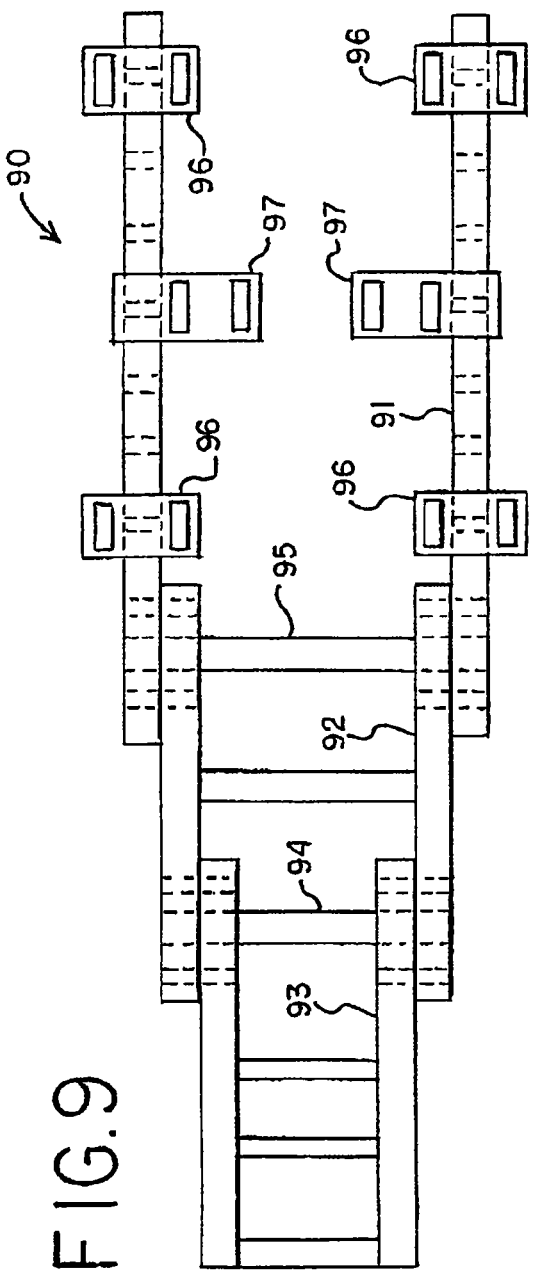
FIG. 9 is a third embodiment of a front tow extended saddle with an offset axle security clamp.

Embodiments of the present invention are highly useful in transporting trucks and other vehicles, including new trucks, from one location to another. While embodiments are most useful in this application, they may also be used to transport other vehicles, such as used cars or trucks, from one dealer to another.

As noted above, embodiments of the front tow extended saddle are aimed at safe and economical delivery of vehicles. Accordingly, vehicles towed with the present embodiments and the present method face forward, their normal direction of travel. In this way, there are no additional side loads or wind loads placed on the vehicles. For instance, many highway class 7 and class 8 vehicle have very large aerodynamic cab features, e.g., large fairings designed to deflect the winds encountered in high speed driving. When a truck with these large surface features is towed while facing rear-ward, the beneficial effect of these features is lost. Instead, the aerodynamic features may almost be said to act as a thrust-reverser, since the wind is caught in the rear of the cab. The features and fairings may not be designed for these reversed loads. Thus, in many cases, cabs must be reinforced and buttressed to prevent damage from rear-facing tows at high speed.

In addition, the front tow extended saddle is intended to be as low-profile as possible, in the sense of minimizing the height of the towed vehicle. Minimizing the height assures the safest travel over highways that cross bridges, ramps, and other overpasses. In addition, minimizing the height also minimizes the stress to which the vehicle or truck is subjected when it is hoisted or lifted into position for the tow. Finally, the front tow extended saddle is intended to function in as economical a manner as possible. The saddle is designed with minimal vertical rise and maximum support of the towed load. One embodiment is preferably configured so that it may be folded into itself for easiest transport when it is not being used. This embodiment is preferably equipped with pivots (sleeves) and locking pins to secure the saddle in place. Other embodiments may be bolted, welded or otherwise configured in a permanent configuration that is not able to be folded into itself.

FIGS. 1-2 depict a first embodiment of a front tow extended saddle with a bent configuration that is permanent. Front tow extended saddle 10 includes a rear portion 11, a middle portion 12, and a front or forward portion 13. Rear portion 11 is mounted at a first angle A to middle portion 12, which is mounted at a second angle B to front portion 13. The left and right sides, rails, of each portion are preferably made from hollow rectangular tubing, such as 2¾"×6" hollow structural sections (HSS), made from ¼" plate. Other sizes and thicknesses may be used. In this embodiment, rear portion 11 is necessarily wider than the other portions so that rear portion 11 may support the frame rails of the towed truck. The sides of rear portion 11 may be secured with cross members 18 as shown. Cross members 18 preferably do not interfere with clearances for mounting rear portion 11 to the towed vehicle. The cross members may be secured to the left and right sides by welding or other structural assembly method. In one embodiment, the rails of rear portion 11 are about 48 to 56 inches long and are spaced apart about 30-32 inches (inner distance). As may also be seen in FIG. 2, rear and front portions 11, 13 are parallel to each other, while each of rear, middle, and front portions 11, 12, 13 is on a different plane.

Middle portion 12 is also preferably made from left and right sides of hollow rectangular tubing, secured to each other by cross member 12a, preferably by welding. Middle portion 12 may be narrower than rear portion 11, and may be wider than front portion 13. In one embodiment, the rails of middle portion 12 are about 36-40 inches long and are spaced apart to that their outer width (distance on the outer sides of the rails) is slightly less than the inner distance between the rails of the rear portion.

Front portion 13 is narrower yet than middle section 12, and front portion 13 includes left and right sides made from hollow structural sections as described above. The sides are secured to each other by cross members 19. In one embodiment, the rails of front portion 13 are about 34-38 inches long and are separated such that the outer distance between the rails is just less than the inner distance of the rails of middle portion 12. The hollow tubing used for the rails in some embodiments is about 6 inches high and about 2¾ inches wide. In these embodiments, each successive pair of rails is about 5½ inches, or a little more clearance for easier handling, narrower or wider than the next pair. The front portion also includes a mount 14 for securing to the towing vehicle. In this embodiment, the rear, middle, and front portions are preferably rigidly assembled to each other by welding. Other methods, such as fasteners, may also be used. Mount 14 includes a king pin for directly mounting to a fifth wheel of the towing vehicle, also allowing for rotation of the extended saddle with respect to the towing vehicle. A small amount of rotation is desirable in order to allow the towed vehicle to more easily accomplish turns during the towing procedure.

Rear portion 11 of front tow extended saddle 10 mounts the towed truck using security assemblies that attach to the towed truck frame and axle security assemblies that attach to the front axle(s) of the towed truck. Accordingly, the left and right side rails of rear portion 11 include a plurality of mounting holes 17. The placement of the holes allows the user to select the most appropriate pattern for mounting to a particular vehicle. It is understood that the embodiments described herein are applicable to class 7 and 8 over-the-road trucks, although other vehicles may also be towed using these embodiments. These trucks may vary in their configurations, i.e., a standard front axle, placed about 40" from the front of the truck, or a set-back axle, 43-46" from the front. The axle itself may be a standard axle, with an I-beam cross section, or may be a Henderickson axle, with a cross section shaped more like a square. The positions of the lower security assemblies, attaching to the frame, and the axle security assemblies, attaching to the axle, should be horizontally adjustable with respect to rear portion 11 to accommodate these differences.

Another embodiment of a front tow extended saddle is depicted in FIGS. 3-4. In this embodiment, economy of operation is emphasized, because the front tow extended saddle 30 is made foldable or collapsible by incorporating pivots between the three portions, rear portion 31, middle portion 32, and front portion 33. Rear portion 31 is preferably made from hollow structural sections, such as hollow square tubing, the left and right sides preferably secured with at least one cross member 43, the cross member placed so that it does not interfere with placement of the lower security assemblies 36 or axle security assemblies 35, which may be similar to those described above. Rear portion 31 mounts the axle security assemblies and lower security assemblies using a plurality of mounting apertures 37. The security assemblies are preferably mounted to rear portion 31 using the apertures and bolts (not shown). There are also apertures for insertion of locking pins 40.

Middle portion 32 is pivotally secured to rear portion 31 by a pivoting sleeve 38 and is collapsibly secured by locking pins 40. Middle portion 32 is pivotally secured to front portion 33 by a pivoting sleeve 39 and is collapsibly secured by locking pins 41. In addition to the pivoting sleeve, each pivot may also include a solid pivot pin within the sleeve to insure the strength of the pivot during towing operations. The front tow extended saddle is secured by locking pins 40, 41 when the saddle is intended for towing a truck. In the extended position, front and rear portions 33, 31 are preferably parallel, i.e., parallel to each other.

After the tow is complete, saddle 30 may be collapsed or folded by removing the locking pins and using the pivoting sleeves to fold the saddle into a much smaller space for a return trip. For instance, if two trucks are being delivered, one towing and one towed, the front tow extended saddle may be returned in a pick-up truck or much smaller vehicle, rather than waiting for a return trip by a large truck. Because of the much smaller volume of the folded saddle, it is possible to return several of the folded saddles in a single return trip, by either a large truck or a smaller truck capable of handling the load.

For this reason, in a preferred embodiment, the outer width of the middle portion is less than an inner width of the rear portion, and the outer width of the front portion is less than an inner width of the middle portion. In other embodiments, there may be only a single collapsible or pivoting joint, e.g., there may be an embodiment in which an inner width of the middle portion is less than an outer width of the front portion, and there is only a forward pivoting junction between the middle and front portions. There may also be another embodiment in which an outer width of the middle portion is less than an inner width of the rear portion and there is only a single pivoting point, a rear pivoting junction between the rear and middle portions.

In the preferred embodiment, the left and right rails of middle portion 32 are joined by cross member 46, and the left and right rails include a plurality of apertures for insertion of locking pins 41. Front portion 33 includes left and right rails or sides that are secured to each other with cross members 44. Front portion 33 also includes mount 34 for mounting to the towing vehicle. Mount 44 in this embodiment is an I-beam configuration for mounting via J-claws into a saddle mount, such as shown in FIG. 12, and disclosed in U.S. Pat. No. 6,109,642, which is hereby incorporated by reference in its entirety, as though each page and figure of the '642 patent were set forth in full in this patent. The saddle mount is preferably secured to the towing truck and the front tow extended saddle is then secured to the saddle mount. The extended front tow saddle mount may have a fifth wheel pin or a king pin for direct insertion into a fifth wheel, and also allowing for rotation. A small amount of rotation is desirable in order to allow the towed vehicle to more easily accomplish turns and maneuvering during the towing procedure.

The front tow extended saddle is secured to the frame of the truck with preferably at least four lower security assemblies. As is well known, truck frames include large, long C-shaped steel members, known generally as channels. The towed truck is mounted to the saddle by two lower security assemblies mounted to a channel on the left side of the truck and two lower security assemblies mounted to a channel on the right side of the truck. A lower security assembly 16 is depicted in FIGS. 5a and 5b. The assembly includes a central structural portion 51, preferably a main hollow structural section 51 and a peripheral flange 52. Flange 52 may be mounted to main section 51 by welding and by webs 54. Webs 54 are preferably sufficiently wide to reinforce the joint and sufficiently narrow so as not to interfere when a user tightens the nuts around the threaded portions of two U-bolts 50. Flange 52 includes apertures 53. U-bolts 50 are mounted around the truck channel and are extended through apertures 53, and are then tightened with the nuts, vertically securing assembly 16 to the rear portion of the front tow extended saddle. Assembly 16 is locked into place horizontally to the rear portion by pins inserted through apertures 57 in the security assembly and apertures 17, 37, in the front tow extended saddles 10, 30, 90. Axle security assemblies 15 are similar in structure to the lower security assemblies.

In some instances, it is difficult to place a U-bolt around a channel or frame of the vehicle to be towed. This may occur because of lack of clearance or merely awkward placement of engine components 55 in the engine compartment. In these instances, it may be convenient to use additional clamps and straight bolts, in place of the normal, straight-forward U-bolts, in addition to a lower security assembly. One such situation is depicted in FIG. 6. Security assembly 60 includes a lower frame clamp 61, an optional top frame clamp 62, lower security assembly 16, first and second bolts 67, 68, and securing nuts 69. In use, the user places lower frame clamp 61 around truck frame channel 56. As may be seen more clearly in FIGS. 8a and 8b, assembly 60 will preferably include two top frame clamps, a single lower frame clamp 61, two first and second bolts 67, 68, with their nuts, and a single lower security assembly 15.

In this embodiment, viewed from the front of the towed vehicle (not shown), lower frame clamp 61 is mounted on the left side of the towed vehicle and the frame clamp is open on the left side, allowing the lower flange of channel 56 to enter clamp 61. Mounted on the same open, left side is top frame clamp 62, which is mounted to a convenient structural hard point, such as a top frame rail flange. Top frame clamp 62 is then secured to lower frame clamp 61 and lower security assembly 15 by longer bolt 67 and nut 69. On the other side, lower frame clamp 61 is secured to lower security assembly 15 by shorter bolt 68 and nut 69. The assemblies are preferably mounted so that frame 56 cannot escape lower frame clamp 61 during the normal stresses and loads encountered during a relatively high-speed tow over a long distance.

Top frame clamp 62 and lower frame clamp 61 are shown in greater detail in FIGS. 7a-7b and FIGS. 8a-8b, and are further explained here. Top clamp 62, shown in FIGS. 7a-7b, is intended to mount to a structural point and help secure the towed vehicle. Clamp 62 is a single structural piece that includes a top portion 63, a lower bolt-mounting portion 64, and reinforcing webs 66. There is also an aperture 65 for a bolt to pass through. Top portion 63 is rounded to form about a 180° curve preferably having a 1½ inch diameter. Lower frame clamp 61, FIGS. 8a-8b, is also a single structural piece that is preferably, but not necessarily made from several components. Mounting plate 81 is made from a rectangular piece of steel, shorter in the direction of truck travel, as shown, and includes apertures 82 for bolts. Clamp lower jaw 83 is preferably integral with or welded or otherwise secured to mounting plate 81. Lower jaw 83 is also preferably integral with jaw web 84 and upper jaw 85, leaving area 86 open for engaging a frame member of a truck.

One method of using the front tow extended saddle includes a way to preserve the dimensional integrity of the truck frame elements, typically made with a C-channel cross-section as shown in FIG. 6. The method uses an inner frame spacer block assembly 70, as depicted in FIG. 7c, to reinforce the truck frame elements. A spacer block 71 is preferably about 8-10 inches in height, depending on the distance between the inner flange surfaces of the channel, and may be about 2 inches square to 4 inches square, or may alternately have a rectangular cross section. Other heights and cross sections may be used. The spacer block is preferably threaded on its inner surface to accommodate an expansion bolt 75 for adjusting an overall height of the assembly. Bolt 75 preferably has an expansion pad 73 on its upper surface to spread the load that is imposed when the spacer block assembly is inserted between flanges and tightened.

Optionally, there may also be an expansion pad 72 on the opposite side of spacer block 71. The spacer block assembly is placed between the flanges and the height adjusted by threading bolt 75 further into or out of block 71. When the height adjustment is correct, expansion adjustment nut 74 is tightened. One or more inner frame spacer block assemblies may be used to preserve the dimensional integrity of the truck frame components, such as channels. The inner frame spacer block assembly may also be used with structural members having cross section of different shapes, such as I-beams.

Figure 10:
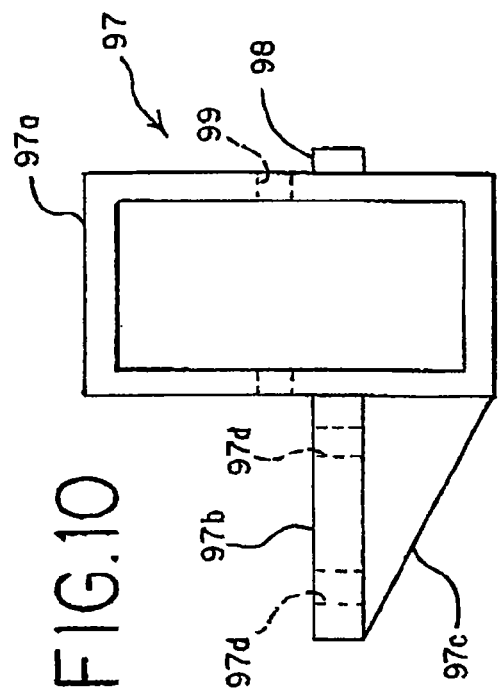
FIG. 10 is a front view of an offset axle security clamp of FIG. 9.

It is understood that the front tow extended saddle described herein may have many embodiments and may be used in many ways. Another embodiment of a front tow extended saddle is depicted in FIGS. 9 and 10. In this embodiment, front tow extended saddle 90 is equipped with two offset axle security assemblies 97. This embodiment is used for applications in which symmetrical axle security members 15, described above, will not fit the truck for which a front tow is desired. Extended saddle 90 includes rear portion 91, middle portion 92, and front portion 93. Middle portion 92 is preferably pivotally mounted to rear portion 91 and front portion 93 by pivot pins 94, 95, as described above. Lower security assemblies 96 are used to secure rear portion 91 to the truck frame, each using two inverted U-bolts and nuts, as are offset axle security assemblies 97.

Each offset axle security member 97 includes a mounting portion 97a, flange 98, apertures 99, and a reinforcing web 97c. Inner portion 97b of flange 98 includes apertures 97d for the mounting U-bolts. Mounting portion 97a is preferably made from hollow square or rectangular tubing and, similar to the other security assemblies, has inner dimensions that allow security member 97 to slide along the rails of rear portion 91. Flange 98 is preferably welded or otherwise rigidly secured to mounting portion 97a, as is reinforcing web 97c. Web 97c is preferably ¼" steel plate and is wide enough to act as an excellent reinforcing member, and narrow enough so as not to interfere with tightening the nuts on the U-bolts. It is understood that the lower security members and the axle security members may take on a number of forms in the embodiments of the front tow extended saddle, not all of which are depicted herein simply because of their multiplicity.

FIGS. 11-12 depict a use for the front tow extended saddle 10. A first truck T1, a towing truck, is preferably equipped with a fifth wheel 101 or a saddle mount 110 as described above. If the towing truck has a fifth wheel, a fifth wheel pin 105 on the front tow extended saddle is mounted to the fifth wheel 101, allowing for rotation during transport. If the towing truck does not have a fifth wheel, saddle mount 110 may be mounted on the towing truck to connect the front tow extended saddle. Saddle mount 110 includes a saddle body 112, a saddle head surface plate 114, a saddle head 116, kingpin 118, and J-claws 120 for grasping the mounting portion 14 of front tow extended saddle 10. The rear portion of front tow extended saddle 10 is then attached to towed truck T2.

Embodiments are not limited to a single towed truck, since more than one truck may be towed, so long as the total length limitation for a combination of towing and towed vehicles, currently 97 feet, is not exceeded. As depicted in FIG. 11, the front tow extended saddle 10 allows for adjusting the distance between the towed vehicle and the towing vehicle, allowing a somewhat greater distance between the vehicles than the prior art. In either embodiment, with a fifth wheel or a saddle mount, the front axle of the truck being towed, and thus the front wheels, are lifted off the ground only about 8-12 inches, thus minimizing any height increase of the vehicle being towed.

The embodiments described above are only a few of the many possible configurations and uses of the front tow extended saddle. The angled construction disclosed is very useful for mounting a towed truck to a towing truck while minimizing the increase of height of the towed vehicle. The preferred mounting is to lift the front wheels of the towed vehicle off the ground, thus minimizing wear and stress on the towed vehicle while maximizing control by the towing vehicle. If desired, all wheels of the towed vehicle can remain on the ground during towing, but lifting the front wheels off the ground is the preferred method.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A front tow extended saddle, comprising:
a front portion comprising a first set of two spaced apart bars on a first plane for interfacing with a saddle mount or with a fifth wheel of a towing vehicle; and
a rear portion comprising at least a second set of two spaced apart bars not on the first plane for adjustably mounting to an axle and a frame of said vehicle to be towed and supporting said frame,
wherein the front portion is joined at an angle to the rear portion, and wherein the front portion is configured for mounting to the towing vehicle and the rear portion is configured for horizontally-adjustable, rigid mounting to the vehicle to be towed, and wherein the front portion is configured to allow rotation of the front tow extended saddle with respect to the towing vehicle; and
wherein the rear portion comprises a middle section comprising a second set of two spaced apart bars, the middle section rotatably joined to the front portion with a first pivot; and a rear section, and the rear portion also comprises a rear section comprising a third set of spaced apart bars, the rear section rotatably joined to the middle section with a second pivot, and further comprising apertures and locking pins for preventing rotation of the front portion to the rear portion and for preventing rotation of the rear section to the middle section.

2. A method of preparing to tow a forward-facing towed truck with a towing truck, the method comprising:
furnishing a front tow extended saddle according to claim 1;
mounting the front portion to the towing truck;
adjusting a horizontal position of at least two axle security assemblies;
fixedly mounting the rear portion to an axle of the towed truck using the at least two axle security assemblies;
adjusting a horizontal position of at least two lower security assemblies; and
fixedly mounting the rear portion to a body of the towed truck using the at least two lower security assemblies, wherein front wheels of the towed truck are optionally raised from a ground surface and wherein said rear portion supports said body.

3. The method of claim 2, further comprising a step of towing the forward-facing towed truck using the front tow extended saddle.

4. The method of claim 2, further comprising reinforcing a truck structural member by placing at least one inner frame spacer block assembly within said truck structural member.

* * * * *